(12) United States Patent
Fan

(10) Patent No.: US 9,047,906 B2
(45) Date of Patent: Jun. 2, 2015

(54) DUAL-LAYER MAGNETIC RECORDING STRUCTURE

(71) Applicant: SEAGATE TECHNOLOGY, LCC, Cupertino, CA (US)

(72) Inventor: Zhaohui Fan, Fremont, CA (US)

(73) Assignee: Seagate Technology, LLC, Cupertino, CA (US)

( * ) Notice: Subject to any disclaimer, the term of this patent is extended or adjusted under 35 U.S.C. 154(b) by 133 days.

(21) Appl. No.: 13/631,754

(22) Filed: Sep. 28, 2012

(65) Prior Publication Data

US 2014/0093745 A1    Apr. 3, 2014

(51) Int. Cl.
*G11B 5/84* (2006.01)
*G11B 5/66* (2006.01)
*G11B 5/74* (2006.01)
*G11B 5/855* (2006.01)

(52) U.S. Cl.
CPC *G11B 5/84* (2013.01); *G11B 5/746* (2013.01); *G11B 5/66* (2013.01); *G11B 5/855* (2013.01)

(58) Field of Classification Search
None
See application file for complete search history.

(56) References Cited

U.S. PATENT DOCUMENTS

| | | | | |
|---|---|---|---|---|
| 5,748,421 A * | 5/1998 | Taki et al. | | 360/135 |
| 8,422,169 B2 * | 4/2013 | Fan et al. | | 360/135 |
| 8,711,519 B2 * | 4/2014 | Fan et al. | | 360/135 |
| 2006/0222896 A1 * | 10/2006 | Inomata et al. | | 428/826 |
| 2006/0292400 A1 * | 12/2006 | Suwa et al. | | 428/826 |
| 2008/0170318 A1 * | 7/2008 | Suwa et al. | | 360/48 |
| 2008/0292907 A1 * | 11/2008 | Berger et al. | | 428/828 |
| 2010/0021768 A1 * | 1/2010 | Sonobe et al. | | 428/829 |
| 2010/0067144 A1 * | 3/2010 | Tagami | | 360/110 |
| 2010/0209737 A1 * | 8/2010 | Bian et al. | | 428/827 |
| 2010/0302682 A1 * | 12/2010 | Hinoue et al. | | 360/135 |
| 2011/0039125 A1 * | 2/2011 | Sonobe et al. | | 428/827 |
| 2011/0141620 A1 * | 6/2011 | Fan et al. | | 360/135 |
| 2011/0194207 A1 * | 8/2011 | Sato et al. | | 360/75 |

\* cited by examiner

*Primary Examiner* — Kevin Bernatz

(57) ABSTRACT

The embodiments disclose a dual-layer magnetic recording structure including a top magnetic layer etched to remove patterned portions of the top magnetic layer and a bottom magnetic layer including portions with altered magnetic properties of molecules to reduce net magnetic moments and including portions of unaltered magnetic properties exchange-coupled through the top magnetic layer.

21 Claims, 19 Drawing Sheets

DUAL-LAYER MAGNETIC RECORDING STRUCTURE

BACKGROUND

Bit patterned media (BPM) include a stack recording layer formed by single or multiple magnetic layers with exchange-coupling. Patterns are transferred by ion beam etch (IBE) to remove magnetic materials in the trenches. BPM recording magnetic features are completely separated from each other by removing all the magnetic materials between the features. The pattern fabrication process removing all the magnetic materials between the features causes magnetic damage.

DETAILED DESCRIPTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a dual-layer magnetic recording structure is described for illustrative purposes and the underlying system can apply to any number and multiple types of stack fabrication processes and stack designs. In one embodiment the dual-layer magnetic recording structure can be configured using a bit-patterned media design. The dual-layer recording layer can be configured to include a granular bottom magnetic layer and can be configured to include a non-granular bottom magnetic layer using the present invention.

Figure 1:
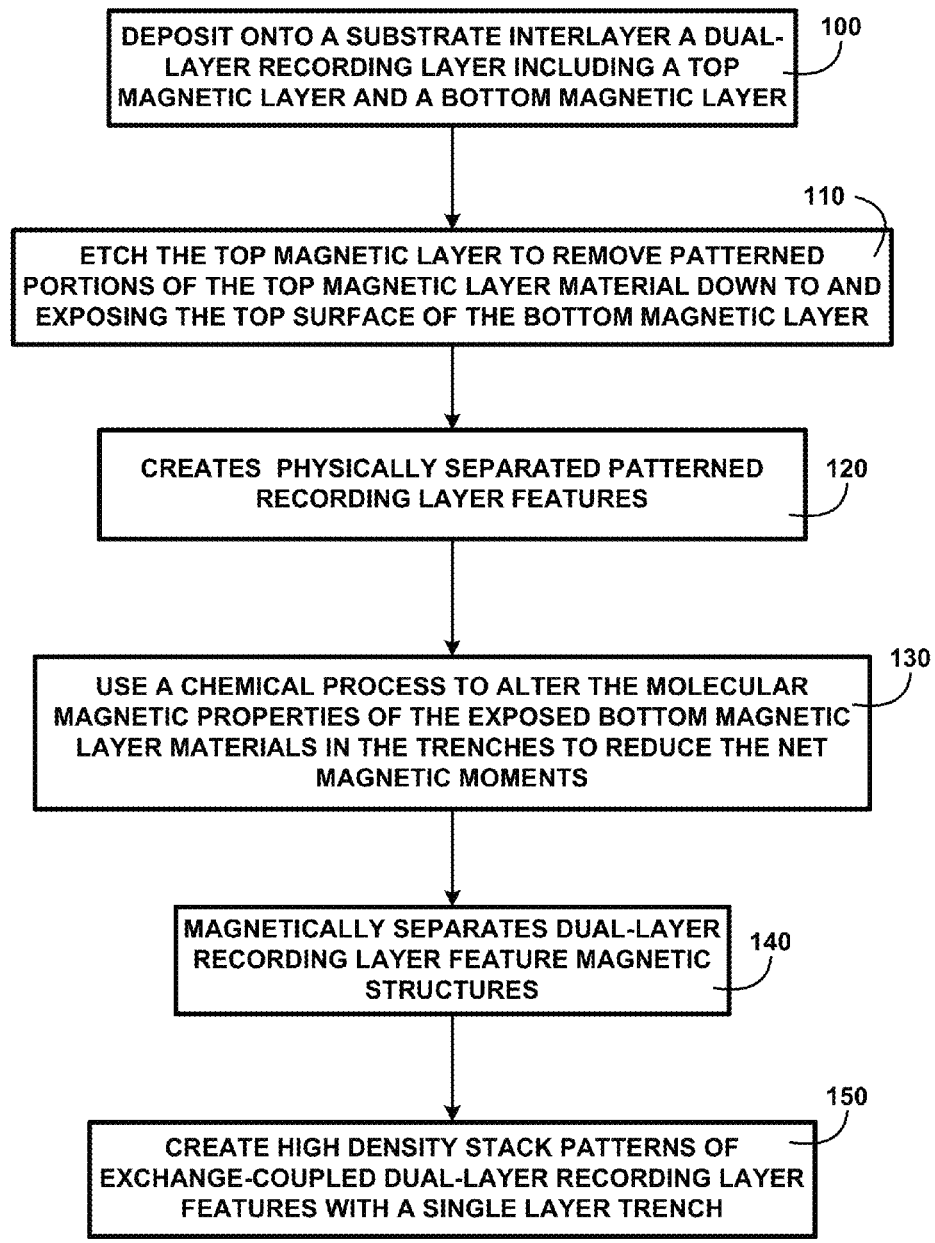
FIG. 1 shows a block diagram of an overview of a dual-layer magnetic recording structure of one embodiment.

FIG. 1 shows a block diagram of an overview of a dual-layer magnetic recording structure of one embodiment. FIG. 1 shows a process to deposit onto a substrate interlayer a dual-layer recording layer including a top magnetic layer and a bottom magnetic layer 100. The dual-layer recording layer is patterned using high areal density patterning for example bit patterned media. A single layer patterning process proceeds to etch the top magnetic layer to remove patterned portions of the top magnetic layer material down to and exposing the top surface of the bottom magnetic layer 110. The top magnetic layer patterning creates physically separated patterned recording layer features 120, such as islands.

The fabrication processes continue to use a chemical process to alter the molecular magnetic properties of the exposed bottom magnetic layer materials in the trenches to reduce the net magnetic moments 130. The chemical processes include chemical reactions for example $O_2$ plasma and ion implantation, reactive ion etch (RIE), and/or other intermixing processes. The chemical alteration of the molecular magnetic properties includes oxidizing the metal particles and oxidative decomposition. The treatment magnetically separates dual-layer recording layer feature magnetic structures 140. The untreated sections of the bottom magnetic layer are exchange-coupled through the top continuous magnetic layer creating a dual-layer recording layer magnetic structure with a single layer trench.

The single layer trench of the top magnetic layer and processes used to reduce the magnetic moment of the bottom magnetic layer in the trenches create a magnetic structure wherein a bottom magnetic layer is exchange-coupled through the top continuous magnetic layer. The remaining top magnetic layer materials and feature sections bottom magnetic layer with non-reduced magnetic moments combine to separate magnetic features and form a dual-layer recording layer in the features in a high areal density stack including BPM.

The dual-layer recording layer in the features creates a dual-layer magnetic structure recording layer with single layer trench to enable fabrication of optimal thickness of high areal density stacks. The single layer trench is accomplished by reducing the amount of magnetic materials removed to only portions in the top magnetic layer. The magnetically separated portions of the bottom magnetic layer do not involve removal of materials.

The optimal physical thickness of the top magnetic layer portions of the dual-layer recording layer in the features have reduced surface exposure subject to being damaged during patterning. The reduced surface exposure reduces the damage to the sidewalls and top surface of the magnetic features. Reduced damage of the magnetic features optimizes magnetic signal strength. Optimized magnetic signal strength creates for example optimized quality and fidelity of read/write retrieval and recording uses in high areal density stacks. The dual-layer magnetic recording structure is used to create high density stack patterns of exchange-coupled dual-layer recording layer features with a single layer trench 150 in one embodiment.

Many advantages accrue to the use of the dual-layer magnetic recording structure. The damage to the magnetic features is reduced since the full thickness of the magnetic materials does not have to be removed using etching processes. The prevention of damage in the bottom magnetic layer achieves optimal exchange-coupled magnetic signals in the features and prevents reduced magnetic signals due to damage of the magnetic layer materials. The pattern etching of only the top magnetic layer achieves optimized accuracy in transferring of for example BPM dot features enabling optimal high areal density.

The alteration of the magnetic properties of the exposed sections of the bottom magnetic layer used to create magnetic separation of the features offers another advantage by eliminating the fabrication processes for the removal of bottom magnetic layer materials. The reduced damage to the exchange-coupled features, resulting reduction in the losses of magnetic signal strength, creation of magnetic separation without physically removing all the magnetic materials in the trench features reduces the distance of the physical separation of magnetic features. The reduction in the distance of physical separation facilitates planarization processes, fabrication of a thinner recording layer, (≤8 nm), enabling optimization of high areal density (>1 Tb/in^2) and optimizing flyability and reliability issues of stacks used for magnetic recording including BPM.

DETAILED DESCRIPTION

Figure 2A:
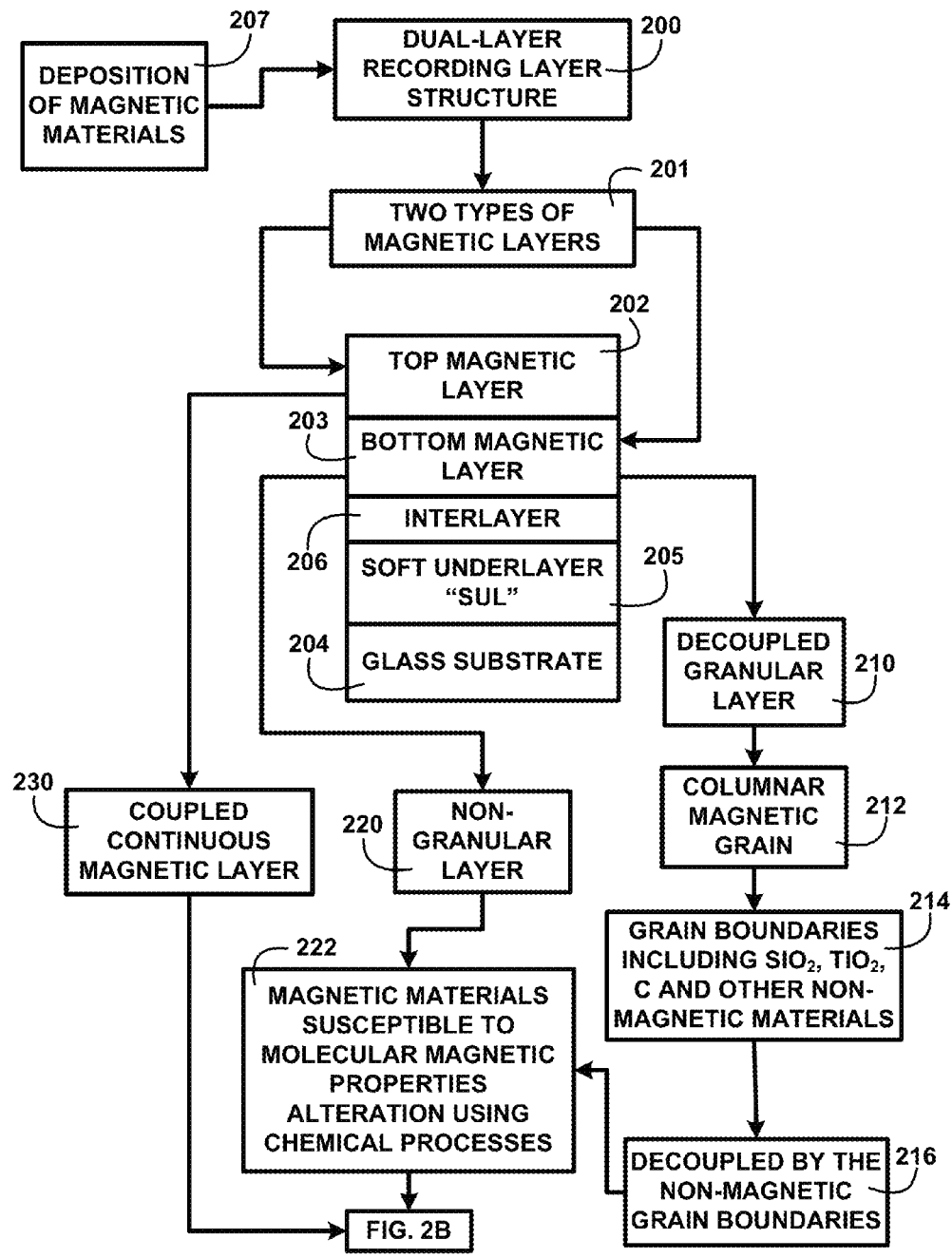
FIG. 2A shows a block diagram of an overview flow chart of a dual-layer magnetic recording structure of one embodiment.

FIG. 2A shows a block diagram of an overview flow chart of a dual-layer magnetic recording structure of one embodiment. FIG. 2A shows a deposition of magnetic materials 207 used to deposit a dual-layer recording layer structure 200 including the two types of magnetic layers 201. The dual-layer recording layer structure 200 includes for example a glass substrate 204, a soft underlayer "SUL" 205 and an interlayer 206. The bottom magnetic layer 203 is deposited on the interlayer 206. The top magnetic layer 202 is deposited on the bottom magnetic layer 203. The top magnetic layer 202 includes for example a coupled continuous magnetic layer 230 of one embodiment.

The bottom magnetic layer 203 for example includes a decoupled granular layer 210 or a non-granular layer 220 using magnetic materials susceptible to molecular magnetic properties alteration using chemical processes 222. The decoupled granular layer 210 includes columnar magnetic grain 212 materials deposited over the top of the interlayer 206. The columnar magnetic grain 212 includes non-magnetic grain boundaries surrounding magnetic materials. For example grain boundaries materials including silicon oxide ($SiO_2$), titanium oxide ($TiO_2$), carbon (C) and other non-magnetic materials 214. The magnetic material of each columnar magnetic grain 212 is decoupled by the non-magnetic grain boundaries 216 from other surrounding magnetic materials of one embodiment. The overview flow chart continues in FIG. 2B.

Figure 2B:
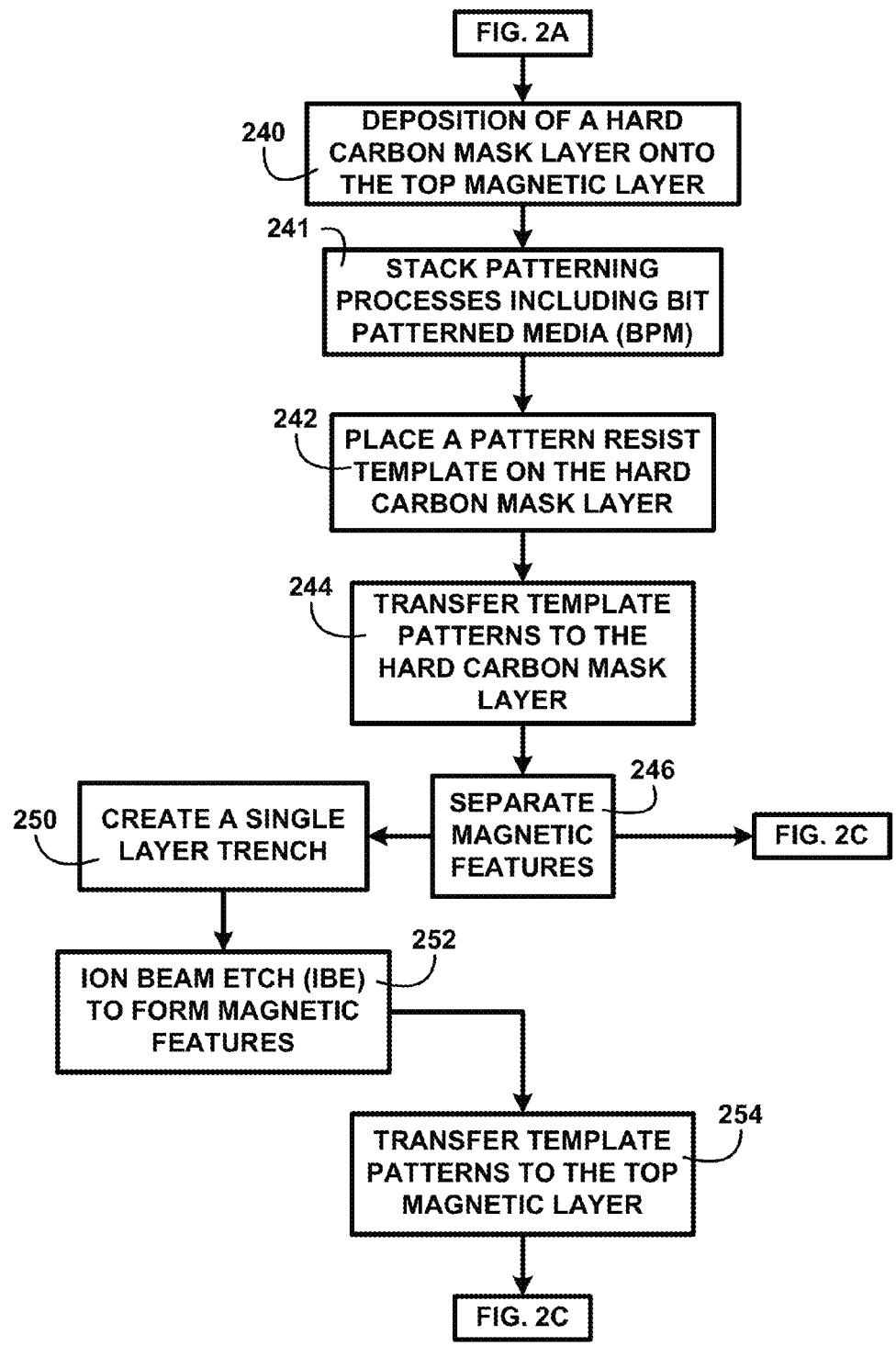
FIG. 2B shows a block diagram of an overview flow chart of a stack patterning process of one embodiment.

Single Layer Trench:

FIG. 2B shows a block diagram of an overview flow chart of a stack patterning process of one embodiment. FIG. 2B shows a continuation of the overview flow chart from FIG. 2A. The process continues including a deposition of a hard carbon mask layer onto the top magnetic layer 240. Stack patterning processes including bit patterned media (BPM) 241 include for example a patterned resist template patterned by nano-imprint lithography. The stack patterning process includes a process to place a pattern resist template on the hard carbon mask layer 242. A pattern resist template is used to transfer template patterns to the hard carbon mask layer 244 to separate magnetic features 246 described in FIG. 2C.

In another embodiment a method to separate magnetic features 246 and create a single layer trench 250 includes for example processes to transfer template patterns to the top magnetic layer 254. In one embodiment are processes to transfer template patterns to the top magnetic layer 254 including using for example ion beam etch (IBE) to form magnetic features 252. The formation of features separated by trenches creates a physical separation of the magnetic features in one embodiment. A continuation of the overview flow chart is shown FIG. 2C.

Figure 2C:
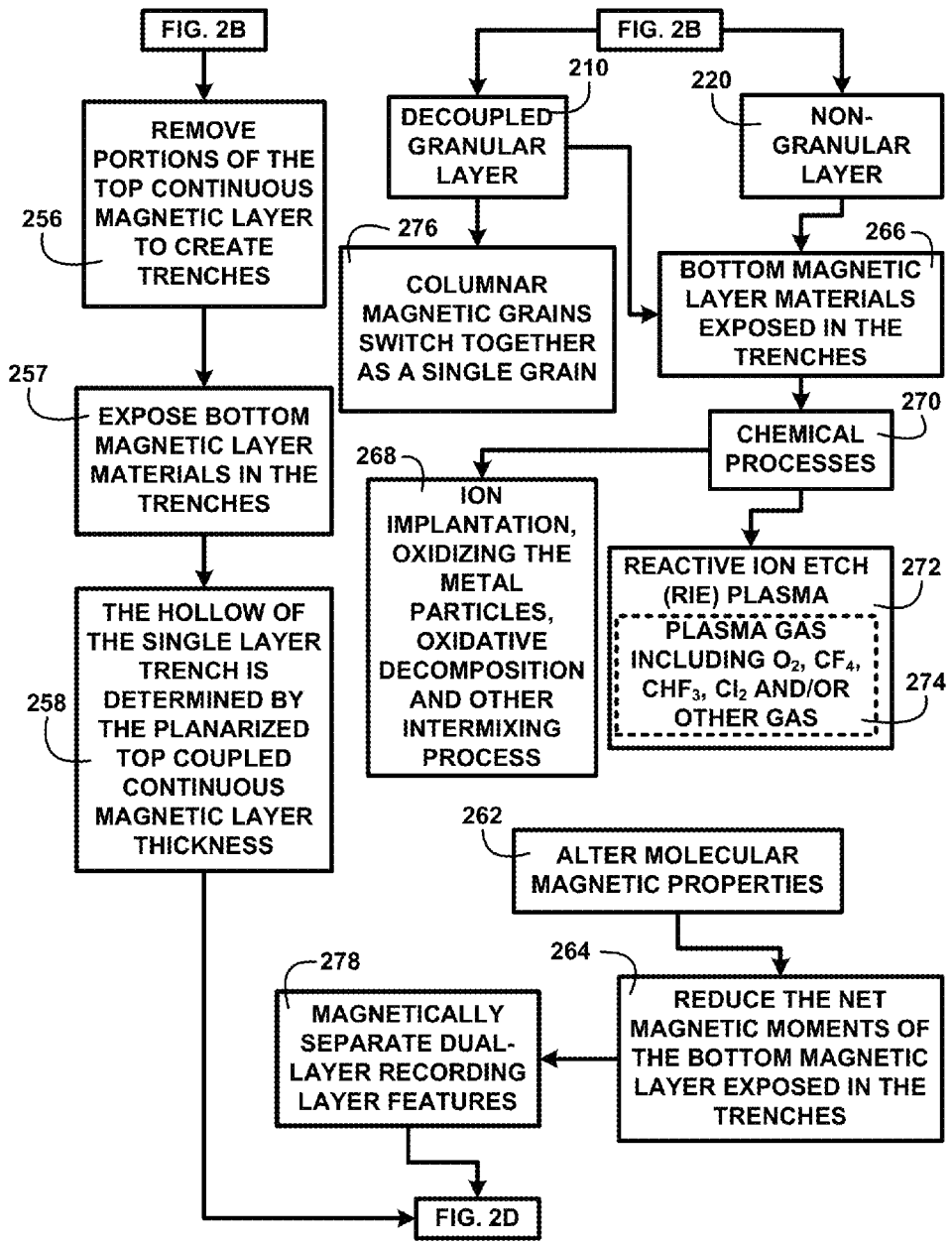
FIG. 2C shows a block diagram of an overview flow chart of a magnetic moment reduction process of one embodiment.

Reduced Magnetic Moment:

FIG. 2C shows a block diagram of an overview flow chart of a magnetic moment reduction process of one embodiment. FIG. 2C shows the next steps in the overview flow chart from FIG. 2B. The stack patterning process including bit patterned media (BPM) is used to remove portions of the top continuous magnetic layer to create trenches 256. The removed materials create trenches and expose bottom magnetic layer materials in the trenches 257. The hollow of the single layer trench is determined by the planarized top exchange-coupled continuous magnetic layer thickness 258. The thickness of the patterned top magnetic layer 202 of FIG. 2A is adjusted using for example planarization processes in one embodiment.

In one embodiment continued from FIG. 2B bottom magnetic layer materials exposed in the trenches 266 including decoupled granular layer 210 and non-granular layer 220 are treated using chemical processes 270 to alter molecular magnetic properties 262. The chemical processes 270 include for example using a reactive ion etch (RIE) plasma 272, using a plasma gas including oxygen gas ($O_2$), tetrafluoromethane ($CF_4$), trifluoromethane ($CHF_3$), chlorine gas ($Cl_2$) and/or other gases 274. In another embodiment the chemical processes 270 include for example ion implantation, oxidizing the metal particles, oxidative decomposition and other intermixing processes 268. The alteration of the molecular magnetic properties is used to reduce the net magnetic moment of the bottom magnetic layer exposed in the trenches 264. The reduction of the net magnetic moments is used to reduce the magnetic moment of the bottom magnetic layer exposed in the trenches 264 to magnetically separate dual-layer recording layer features 278.

A measure of the magnetization remaining in a magnetic material after an inducing magnetic field is removed is referred to as remanent magnetization (Mr) or remanent magnetic moment density. The amplitude of the remanent magnetization (Mr) is proportional to the physical thickness (t) of the magnetic materials and is measured as the materials magnetic thickness (Mrt) of one embodiment. The remanent magnetization changes for example with IBE durations and $O_2$ plasma exposures. The removal of portions of the top magnetic layer 202 of FIG. 2A using IBE uncovers the bottom magnetic layer 203 of FIG. 2A and the Mrt drops significantly after processing using the chemical processes 270. Columnar magnetic grains switch together as a single grain 276 after reducing the net magnetic moments in the trenches of one embodiment. The processing in FIG. 2D.

Figure 2D:
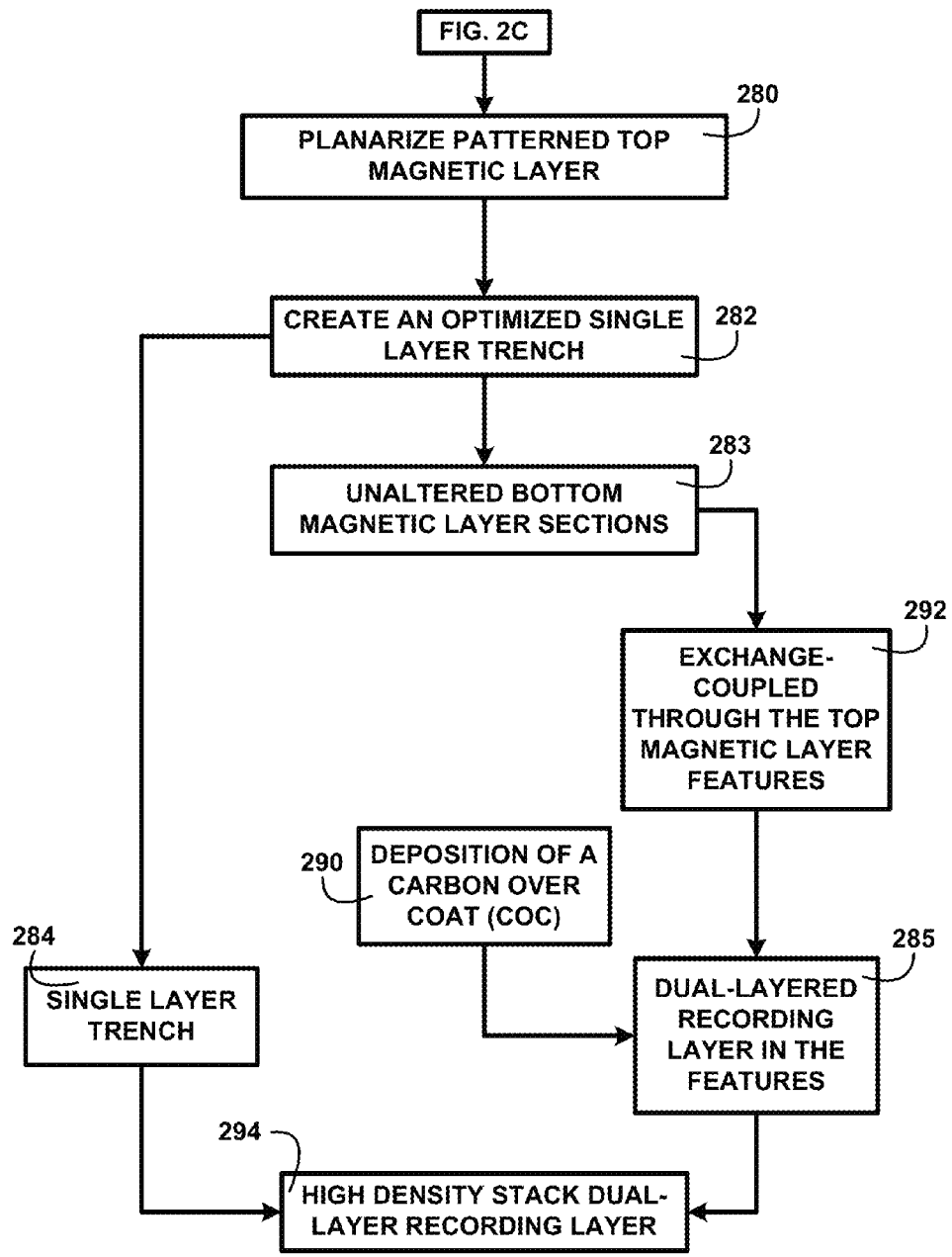
FIG. 2D shows a block diagram of an overview flow chart of an exchange-coupled bottom magnetic layer of one embodiment.

High Density Stack Dual-Layer Recording Layer:

FIG. 2D shows a block diagram of an overview flow chart of an exchange-coupled bottom magnetic layer of one embodiment. Continuing from FIG. 2C, FIG. 2D shows a planarization process 280 used to create an optimized single layer trench 282 of the top coupled continuous magnetic layer. The thickness of the top magnetic layer 202 of FIG. 2A deposition and depth of the planarization process 280 is controlled to determine the single layer trench 284. Unaltered bottom magnetic layer sections 283 are exchange-coupled through the top magnetic layer features 292.

The combination of the top magnetic layer 202 of FIG. 2A and sections of the bottom magnetic layer 203 of FIG. 2A where the molecular magnetic properties have not been altered form a dual-layer recording layer in the features 285. A deposition of a carbon over coat (COC) 290 backfills the trenches and creates a smooth surface on high areal density stacks using the high density stack dual-layer recording layer 294 of one embodiment.

Figure 3A:
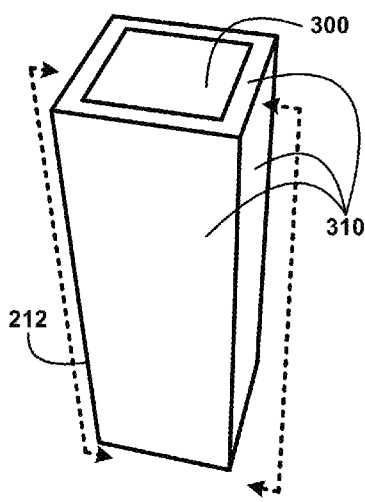
FIG. 3A shows for illustrative purposes only an example of a columnar magnetic grain of one embodiment.

Columnar Magnetic Grain:

FIG. 3A shows for illustrative purposes only an example of a columnar magnetic grain of one embodiment. FIG. 3A shows a columnar magnetic grain 212 that for example is included in the deposition of the bottom magnetic layer 203 of FIG. 2A. The columnar magnetic grain 212 includes for example a magnetic material 300 surrounded by non-magnetic material grain boundaries 310. The non-magnetic grain boundaries decouple the magnetic material 300 from each columnar magnetic grain 212 adjacent to one another in the bottom magnetic layer 203 of FIG. 2A of one embodiment. FIG. 3A shows section lines for the section view of the columnar magnetic grain 212 shown in FIG. 3B.

Figure 3B:
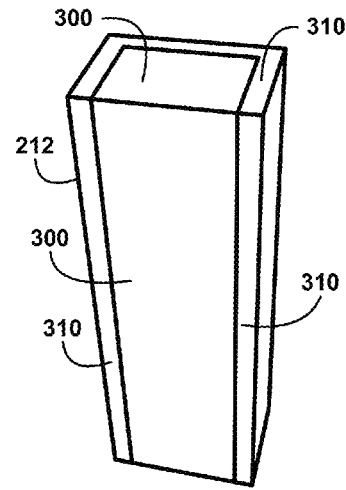
FIG. 3B shows for illustrative purposes only an example of a columnar magnetic grain section of one embodiment.

FIG. 3B shows for illustrative purposes only an example of a columnar magnetic grain section of one embodiment. FIG. 3B shows a section view of the columnar magnetic grain 212. The columnar magnetic grain 212 includes for example a magnetic material 300 in the interior. The magnetic material 300 in the interior is surrounded by non-magnetic material grain boundaries 310 on the sides. The non-magnetic grain boundaries on the sides decouples the magnetic material 300 from the magnetic materials of each adjacent columnar magnetic grain 212 in the bottom magnetic layer 203 of FIG. 2A of one embodiment.

Figure 3C:
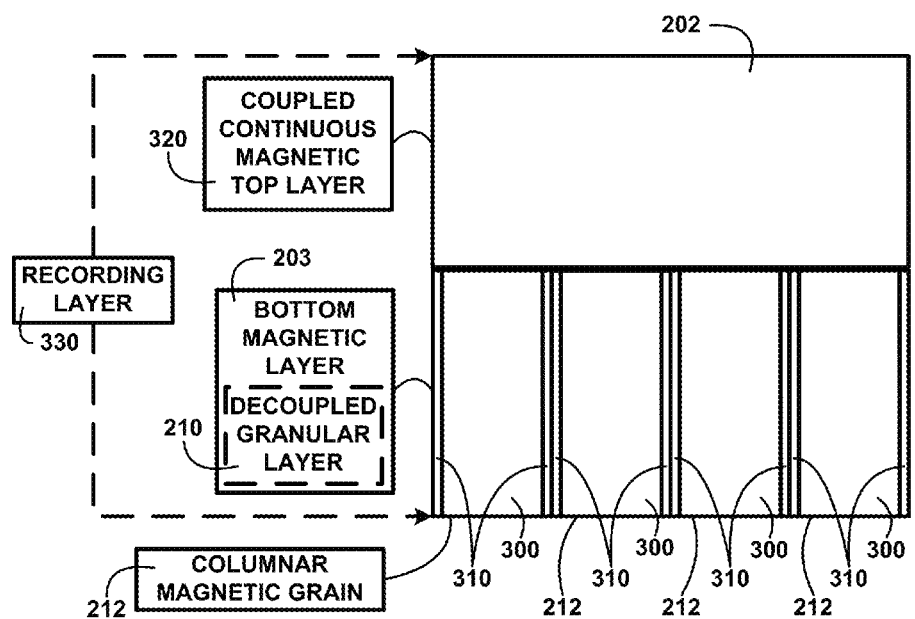
FIG. 3C shows for illustrative purposes only an example of a dual-layer recording layer of one embodiment.

Recording Layer:

FIG. 3C shows for illustrative purposes only an example of a dual-layer recording layer of one embodiment. FIG. 3C shows the bottom magnetic layer 203 that includes for example the decoupled granular layer 210. The columnar magnetic grain 212 material is deposited to form the decoupled granular layer 210. The top magnetic layer 202 includes for example a coupled continuous magnetic top layer 320. A recording layer 330 for example is created using two types of magnetic layers 201 of FIG. 2A including the decoupled granular layer 210 as the bottom magnetic layer 203 and the coupled continuous magnetic top layer 320 of one embodiment. The bottom magnetic layer 203 includes for example columnar magnetic grain 212. The columnar magnetic grain 212 includes the interior magnetic material 300 and the decoupling non-magnetic material grain boundaries 310 in one embodiment.

Figure 3D:
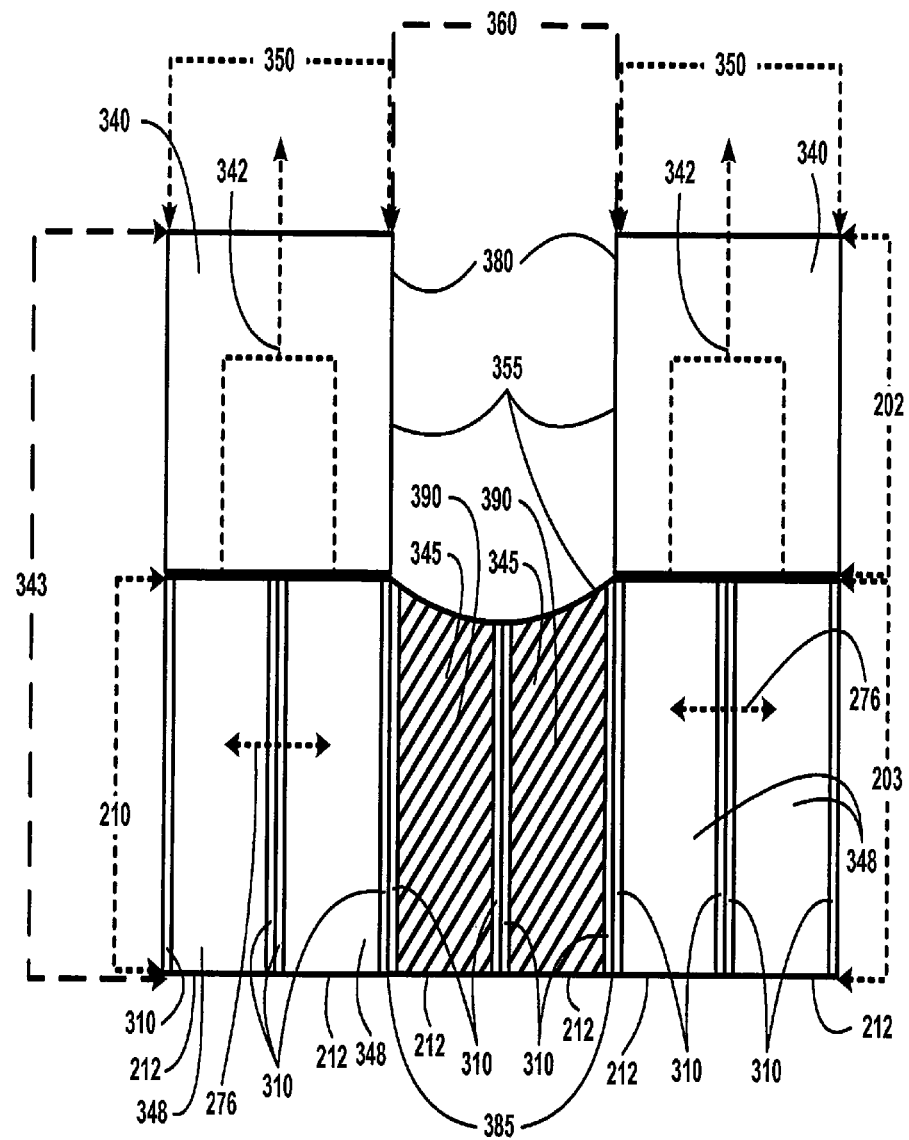
FIG. 3D shows for illustrative purposes only an example of a dual-layer magnetic feature structure of one embodiment.

Dual-Layer Magnetic Feature Structure:

FIG. 3D shows for illustrative purposes only an example of a dual-layer magnetic feature structure of one embodiment. FIG. 3D shows the top magnetic layer 202 patterned using a stack patterning process including bit patterned media (BPM). The patterning process is used to remove the portion of the top magnetic layer 202 in trenches 355. Physical separation 380 of the features in the recording layer 330 of FIG. 3C is achieved with the removal of top magnetic layer 202 material in the trenches 355.

Reduction of the magnetic moment 390 in the bottom magnetic layer 203 for example columnar magnetic grain 212 materials takes place in the trench columnar magnetic grains 345 inside the non-magnetic material grain boundaries 310. The reduction of the magnetic moment 390 in the bottom magnetic layer 203 creates magnetic separation 385 of the features in the recording layer 330 of FIG. 3C. The combined physical separation 380 and magnetic separation 385 create magnetic recording features separation 360 between two or more dual-layer magnetic feature structures 350 of one embodiment.

The dual-layer magnetic feature structures 350 are created using a patterned coupled continuous magnetic layer feature 340, the decoupled granular layer 210 in the feature where the magnetic moment has not been reduced in columnar magnetic grain 212 materials and the decoupled granular layer 210 in the trenches where the net magnetic moment has been reduced using chemical processes to alter the molecular magnetic properties. The feature columnar magnetic grains 348 switch together as a single grain 276. The feature columnar magnetic grains 348 of the bottom magnetic layer 203 are exchange-coupled 342 through the top magnetic layer 202 in the dual-layer magnetic feature structures 350. The magnetic signal strength and density of high areal density stacks are optimized using the dual-layer recording layer 343 including the dual-layer magnetic feature structures 350 in the fabrication processes to create high areal density stacks including BPM of one embodiment.

Figure 4A:
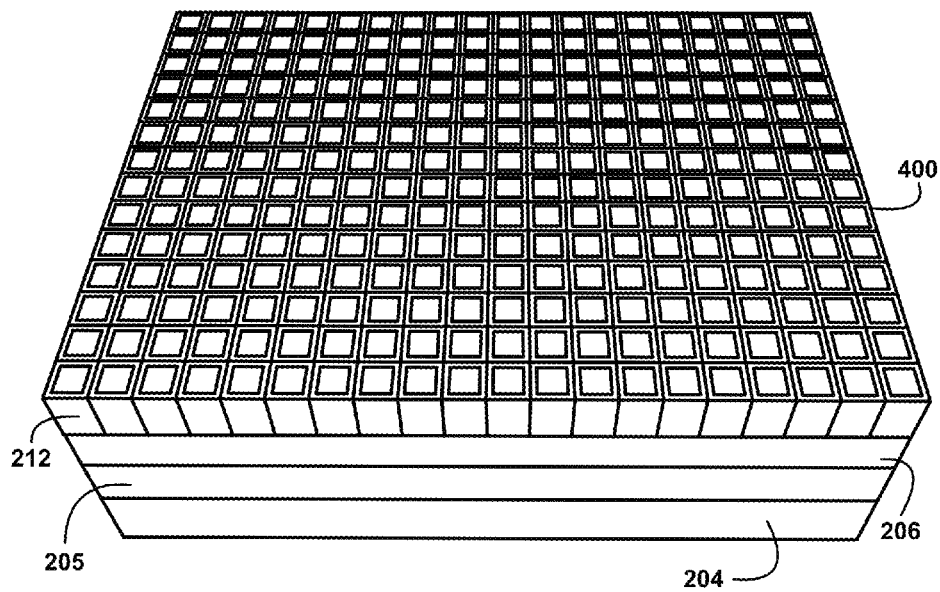
FIG. 4A shows for illustrative purposes only an example of a decoupled granular bottom magnetic layer: of one embodiment.

Decoupled Granular Bottom Magnetic Layer:

FIG. 4A shows for illustrative purposes only an example of a decoupled granular bottom magnetic layer of one embodiment. FIG. 4A shows a stack structure that includes for example the glass substrate 204, soft underlayer "SUL" 205 and the interlayer 206. A decoupled granular bottom magnetic layer 400 is deposited on the interlayer 206. The decoupled granular bottom magnetic layer 400 is deposited using for example the columnar magnetic grain 212 materials of one embodiment.

Figure 4B:
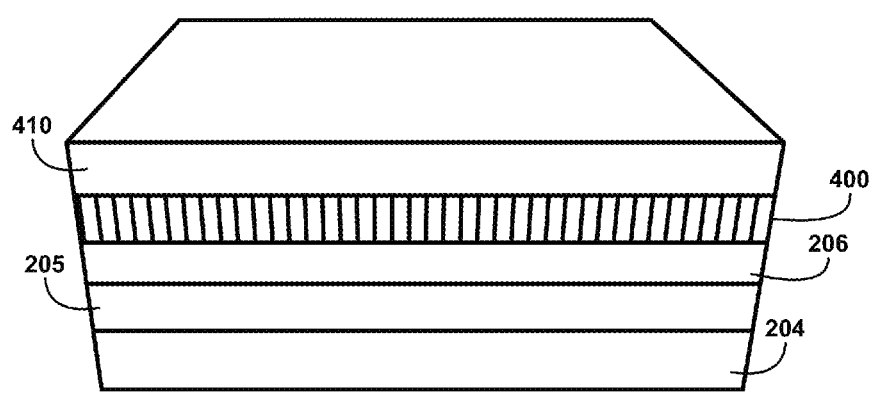
FIG. 4B shows for illustrative purposes only an example of a granular coupled continuous top magnetic layer of one embodiment.

Coupled Continuous Top Magnetic Layer:

FIG. 4B shows for illustrative purposes only an example of a granular coupled continuous top magnetic layer of one embodiment. FIG. 4B shows the dual-layer recording layer on top of the interlayer 206 deposited on the soft underlayer "SUL" 205 atop the glass substrate 204. The dual-layer recording layer includes for example the decoupled granular bottom magnetic layer 400 and a coupled continuous top magnetic layer 410. The decoupled granular bottom magnetic layer 400 is deposited on the interlayer 206. The coupled continuous top magnetic layer 410 is deposited on the decoupled granular bottom magnetic layer 400 to create a dual-layer recording layer of one embodiment.

Figure 4C:
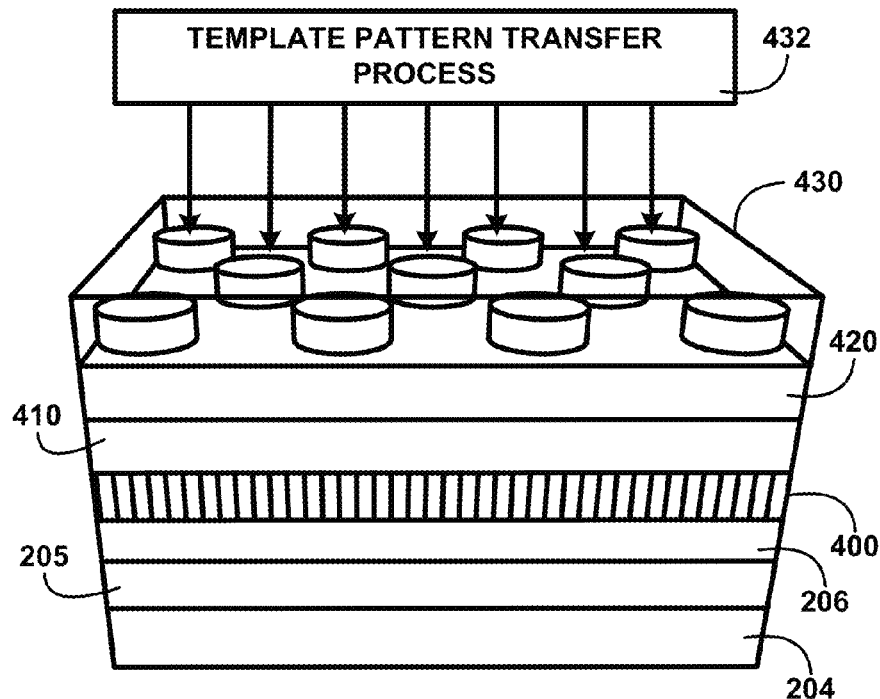
FIG. 4C shows for illustrative purposes only an example of a granular single layer trench pattern transfer process of one embodiment.
Figure 4D:
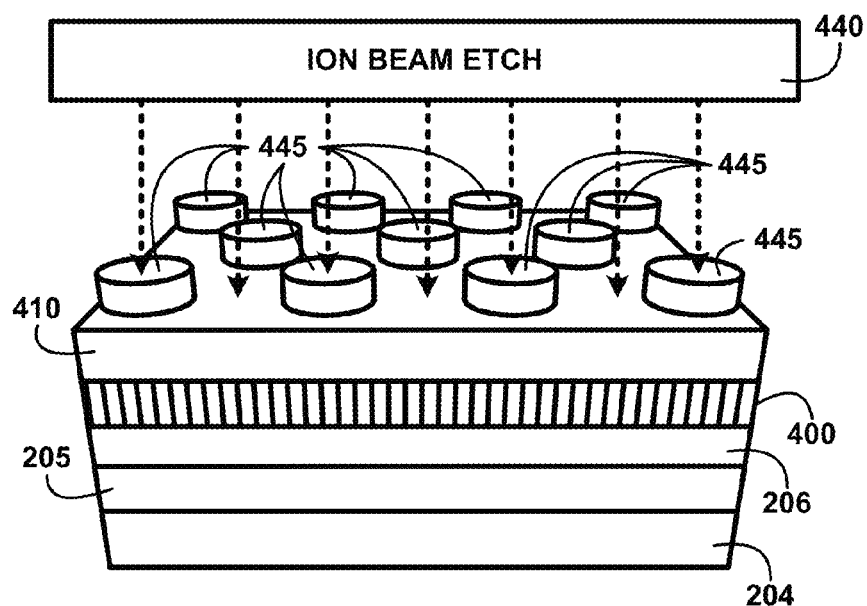
FIG. 4D shows for illustrative purposes only an example of a continuation of a single layer trench pattern transfer process of one embodiment.
Figure 4E:
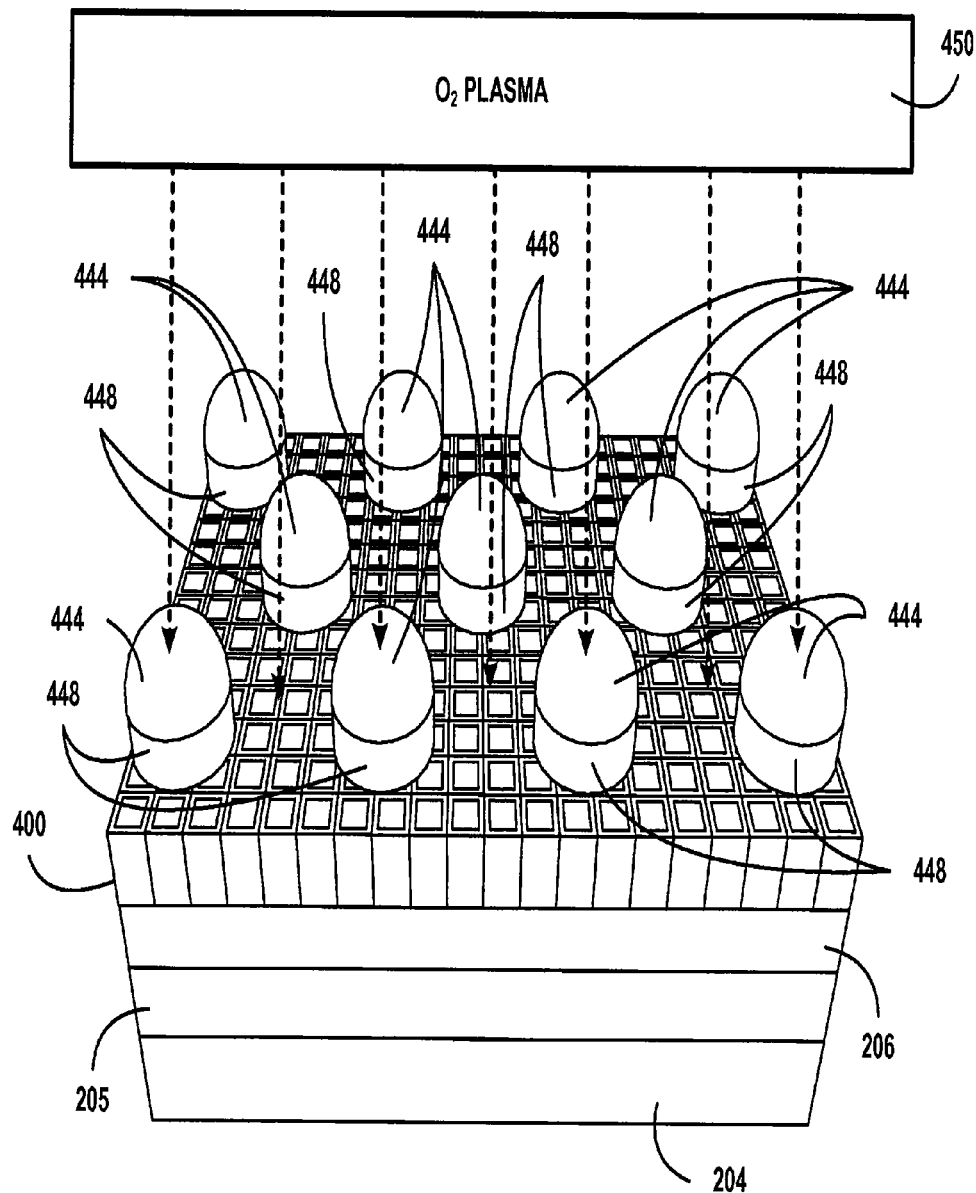
FIG. 4E shows for illustrative purposes only an example of reducing magnetic moments in a decoupled granular bottom magnetic layer of one embodiment.

Template Pattern Transfer Process:

Illustrated in FIG. 4C, FIG. 4D and FIG. 4E is a template pattern transfer process used in the fabrication of high areal density stacks including BPM. FIG. 4C shows for illustrative purposes only an example of a granular single layer trench pattern transfer process of one embodiment. FIG. 4C illustrates an example of a stack structure that includes the glass substrate 204, soft underlayer "SUL" 205, interlayer 206, decoupled granular bottom magnetic layer 400 and coupled continuous top magnetic layer 410. A carbon hard mask 420 has been deposited on the coupled continuous top magnetic layer 410. A patterned resist template 430 patterned by nano-imprint lithography is placed on top of the carbon hard mask 420. A template pattern transfer process 432 includes for example $O_2$ plasma or reverse tone process to transfer the pattern into the carbon hard mask 420 of one embodiment.

FIG. 4D shows for illustrative purposes only an example of a continuation of a single layer trench pattern transfer process of one embodiment. The stack structure include for example the glass substrate 204, soft underlayer "SUL" 205, interlayer 206, decoupled granular bottom magnetic layer 400 and coupled continuous top magnetic layer 410. A pattern transfer process including an ion beam etch 440 is used to mill off the continuous layer in trenches. The trenches are defined by the surface areas of the coupled continuous top magnetic layer 410 not covered by the patterned carbon hard mask 445 for example the patterned features for BPM of one embodiment.

FIG. 4E shows for illustrative purposes only an example of reducing magnetic moments in a decoupled granular bottom magnetic layer of one embodiment. FIG. 4E shows the glass substrate 204, soft underlayer "SUL" 205, interlayer 206 and decoupled granular bottom magnetic layer 400 forming a portion of a stack structure. The chemical reaction 270 of FIG. 2C includes for example $O_2$ plasma 450. The $O_2$ plasma 450 is used to strip residual carbon hard mask 420 of FIG. 4C material and reduce the magnetic moment in the decoupled granular bottom magnetic layer 400 in the trenches. The $O_2$ plasma 450 is used to remove an etched patterned carbon hard mask 444 to the top of patterned continuous magnetic layer 448 features of one embodiment.

Figure 4F:
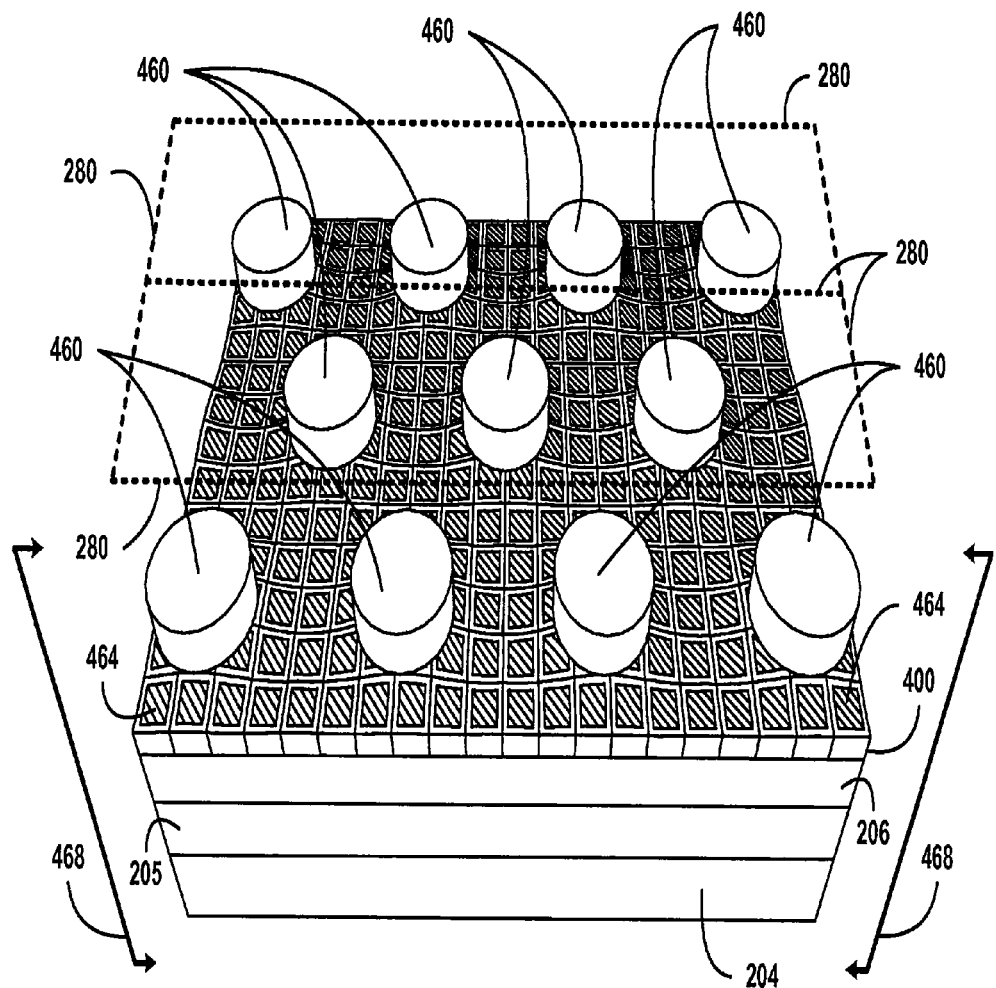
FIG. 4F shows for illustrative purposes only an example of a granular magnetic feature of one embodiment.

Granular Magnetic Features:

FIG. 4F shows for illustrative purposes only an example of a granular magnetic features of one embodiment. FIG. 4F shows a patterned stack structure including the glass substrate 204, soft underlayer "SUL" 205, interlayer 206, decoupled granular bottom magnetic layer 400 and patterned continuous magnetic layer 448 of FIG. 4E features. The ion beam etch 440 of FIG. 4D and the $O_2$ plasma 450 of FIG. 4E have removed the etched patterned carbon hard mask 444 of FIG. 4E to the tops of patterned continuous magnetic layer 448 of FIG. 4E features of one embodiment.

The IBE duration and $O_2$ plasma 450 of FIG. 4E reduced the magnetic moment in those trench sections of the decoupled granular bottom magnetic layer 400. The magnetic moment is reduced by the alteration of the magnet properties of for example the magnetic material 300 of FIG. 3A of the columnar magnetic grain 212 of FIG. 2A materials in the trenches. The reduction of the magnetic moment in the trench columnar magnetic grains 345 of FIG. 3D creates remanent magnetization changes 464 that drop the Mrt significantly of one embodiment.

The planarization process 280 includes for example control of the single layer trench 284 of FIG. 2D of the planarized continuous magnetic layer features 460. The single layer trench 284 of FIG. 2D is described in FIG. 4G in a cross section using a decoupled granular bottom magnetic layer section plane 468 of one embodiment.

Figure 4G:
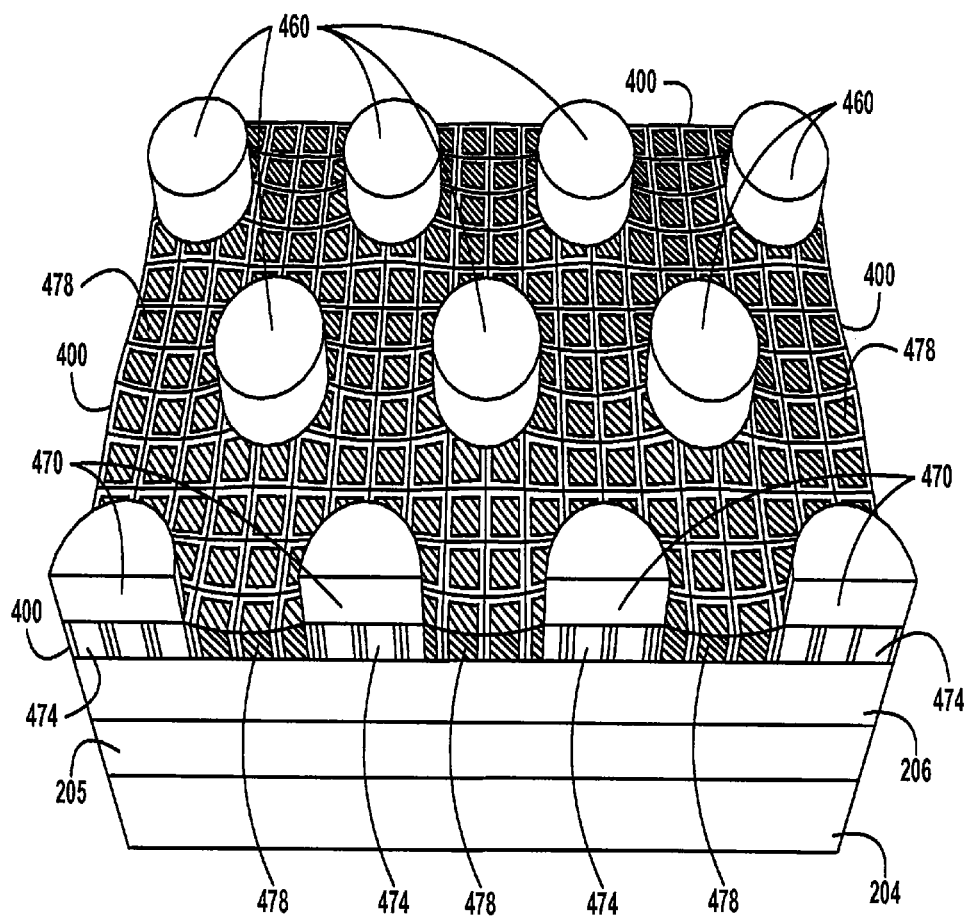
FIG. 4G shows for illustrative purposes only an example of a granular magnetic feature cross section of one embodiment.

Granular Single Layer Trench:

FIG. 4G shows for illustrative purposes only an example of a granular magnetic features cross section of one embodiment. FIG. 4G shows a cross section of the glass substrate 204, soft underlayer "SUL" 205, interlayer 206, decoupled granular bottom magnetic layer 400 and patterned coupled continuous top magnetic layer 448 of FIG. 4E. The planarized continuous magnetic layer features 460 are elevated above the level in the bottom magnetic layer remaining granular layer in the trench by the single layer trench 284 of FIG. 2D of one embodiment.

The cross section shows in the trench sections granular bottom magnetic layer reduced magnetic moment 478. A continuous top magnetic layer feature cross section 470 shows the top portion of the dual-layer magnetic feature structures 350 of FIG. 3D. A decoupled granular bottom magnetic layer cross section 474 shows the bottom section of the dual-layer magnetic feature structures 350 of FIG. 3D. A combined view of the continuous top magnetic layer feature cross section 470 and the decoupled granular bottom magnetic layer cross section 474 illustrates the dual-layer recording layer in the features of one embodiment.

Figure 4H:
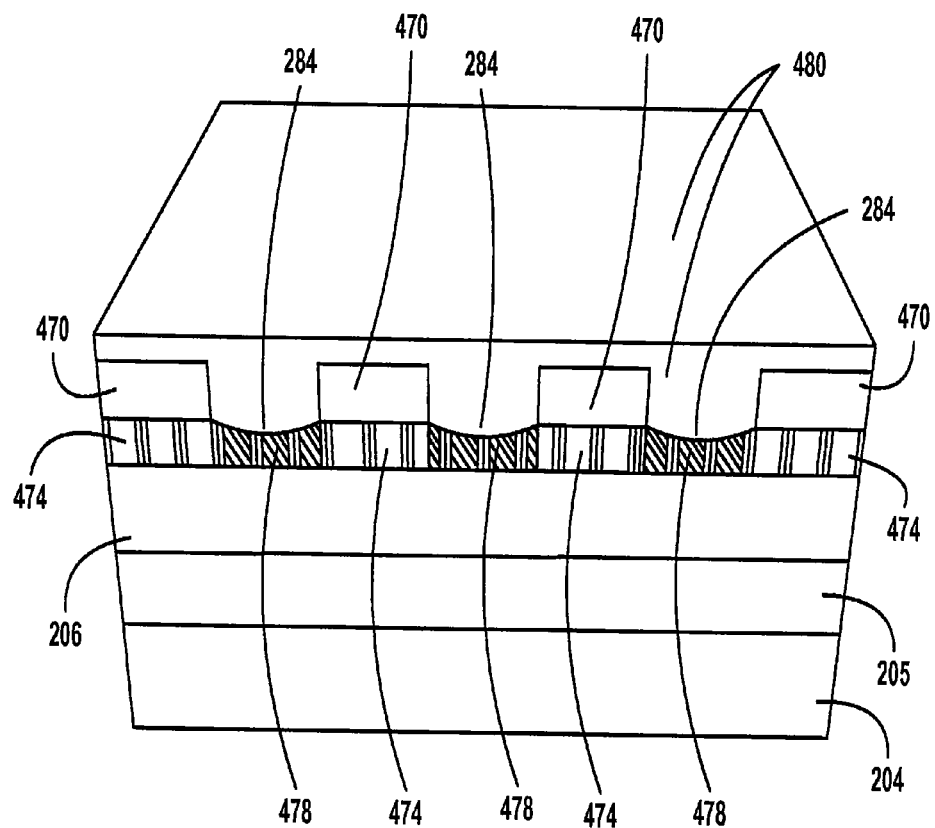
FIG. 4H shows for illustrative purposes only an example of a stack granular dual-layer recording layer of one embodiment.

Granular Dual-Layer Magnetic Feature:

FIG. 4H shows for illustrative purposes only an example of a stack granular dual-layer recording layer of one embodiment. FIG. 4H shows a cross section of the completed high areal density stack structure including the glass substrate 204, soft underlayer "SUL" 205, interlayer 206, continuous top magnetic layer feature cross section 470, decoupled granular bottom magnetic layer cross section 474, granular bottom magnetic layer reduced magnetic moment cross section 478 and a COO layer 480. The COO layer 480 is created using a COO deposition. The COO deposition back fills the trenches, covers the planarized continuous magnetic layer features 460 of FIG. 4F of one embodiment.

The single layer trench 284 to the bottom magnetic layer remaining granular layer in the trenches is unaffected by the COO backfilling. The combined view of the continuous top magnetic layer feature cross section 470 and the decoupled granular bottom magnetic layer cross section 474 shows a high density stack dual-layer recording layer granular magnetic feature. The single layer trench 284 and high density stack dual-layer recording layer granular magnetic feature created using the dual-layer magnetic recording structure is used to increase the areal density of fabricated stacks with exchange-coupling to achieve high quality recording qualities of one embodiment.

Figure 5A:
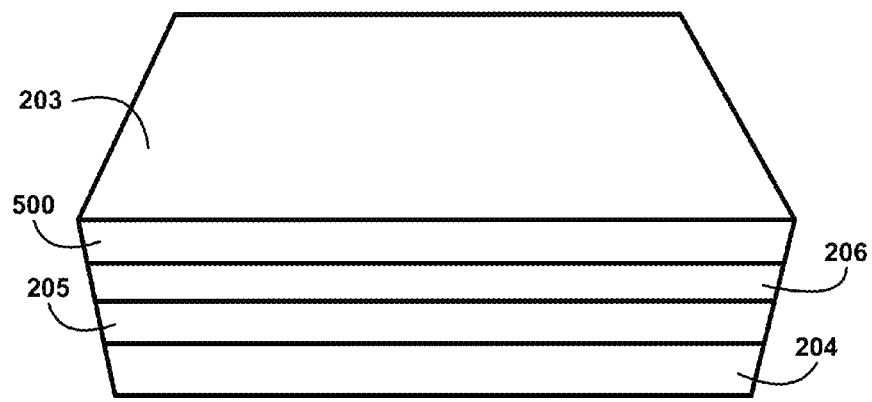
FIG. 5A shows for illustrative purposes only an example of a non-granular bottom magnetic layer: of one embodiment.

Non-Granular Bottom Magnetic Layer:

FIG. 5A shows for illustrative purposes only an example of a non-granular bottom magnetic layer: of one embodiment. FIG. 5A shows a stack structure that includes for example the glass substrate 204, soft underlayer "SUL" 205, the interlayer 206 and bottom magnetic layer 203. The bottom magnetic layer 203 includes for example a non-granular bottom magnetic layer 500. The non-granular bottom magnetic layer 500 is formed by depositing on the interlayer 206 various non-granular materials. The various non-granular materials include for example one or more layers of cobalt-platinum (Co—Pt) and ferric-platinum (Fe—Pt) whose molecular magnetic properties are easily altered. Non-granular materials including Co—Pt and Fe—Pt provide a sufficient etch-stop during the patterning processes of one embodiment.

Figure 5B:
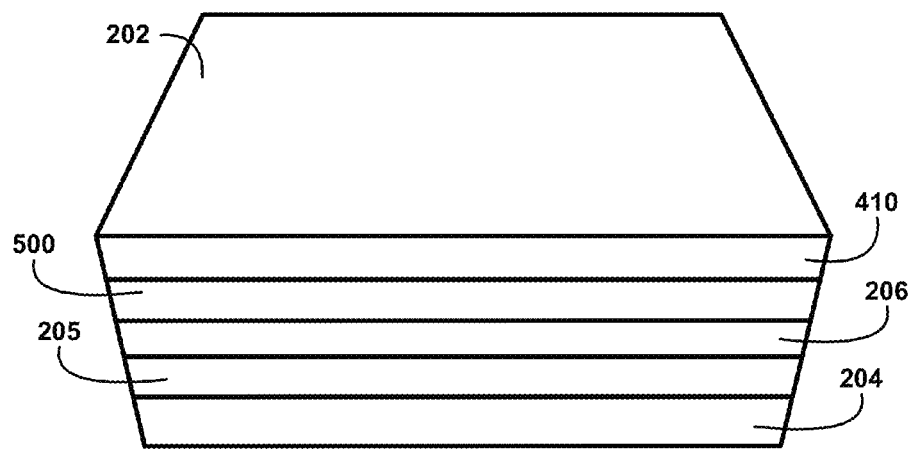
FIG. 5B shows for illustrative purposes only an example of a non-granular coupled continuous top magnetic layer of one embodiment.

Non-Granular Top Magnetic Layer:

FIG. 5B shows for illustrative purposes only an example of a non-granular coupled continuous top magnetic layer of one embodiment. FIG. 5B shows a stack that includes for example the glass substrate 204, soft underlayer "SUL" 205, interlayer 206, non-granular bottom magnetic layer 500 and the coupled continuous top magnetic layer 410. The coupled continuous top magnetic layer 410 deposited on the non-granular bottom magnetic layer 500 creates the top magnetic layer 202 of one embodiment.

Figure 5C:
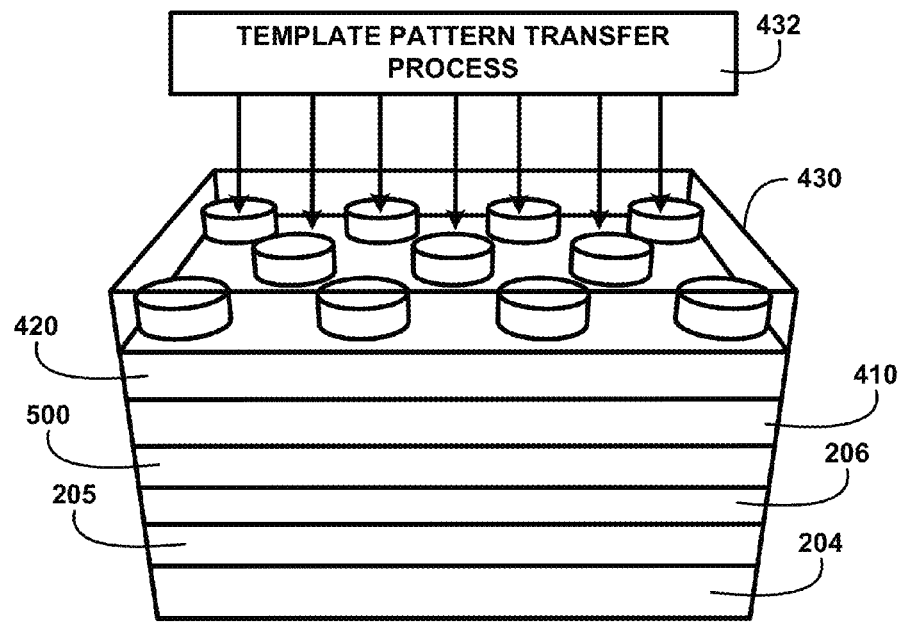
FIG. 5C shows for illustrative purposes only an example of a non-granular single layer trench pattern transfer process of one embodiment.
Figure 5D:
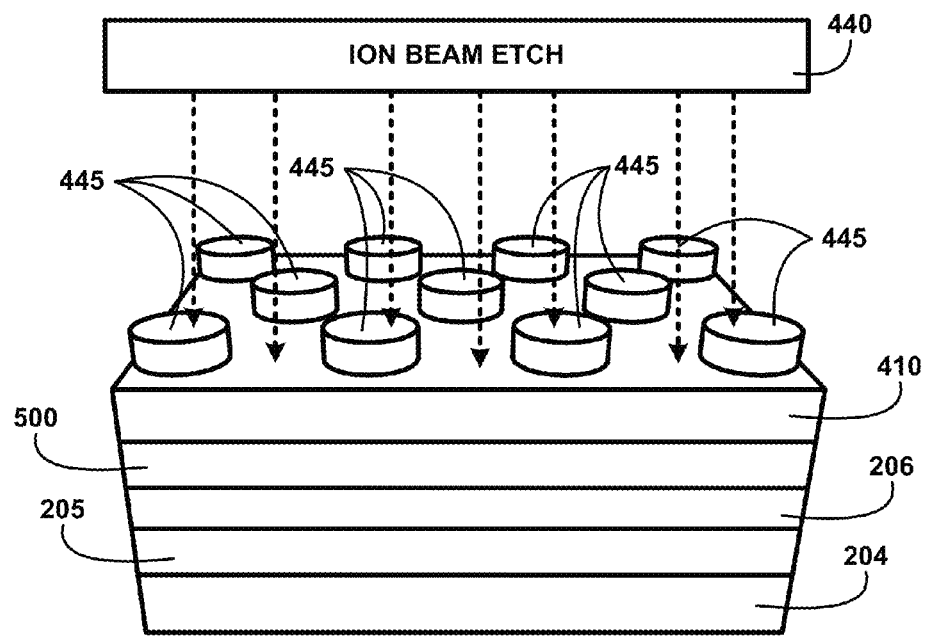
FIG. 5D shows for illustrative purposes only an example of a continuation of a non-granular single layer trench pattern transfer process of one embodiment.
Figure 5E:
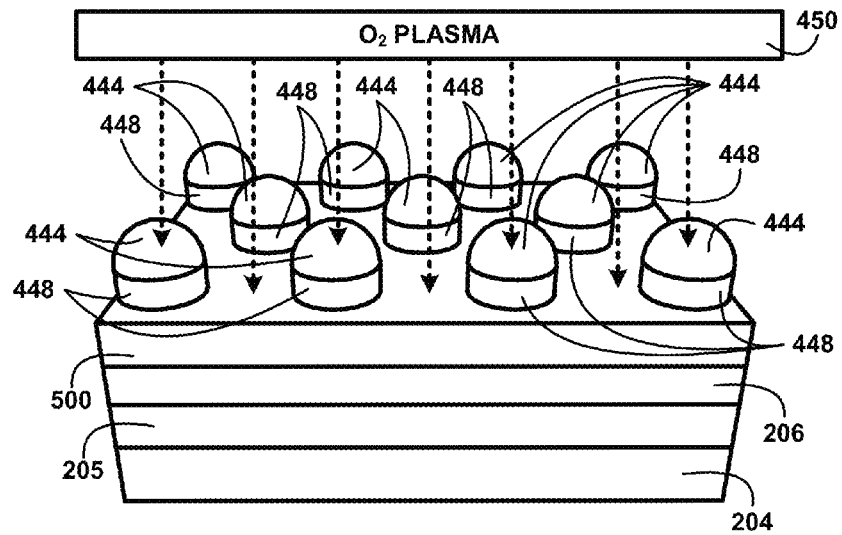
FIG. 5E shows for illustrative purposes only an example of a non-granular magnetic properties alteration of one embodiment.

Patterning Process:

A patterning process for example used in BPM is described in FIG. 5C, FIG. 5D and FIG. 5E. FIG. 5C shows for illustrative purposes only an example of a non-granular single layer trench pattern transfer process of one embodiment. FIG. 5C shows the glass substrate 204, soft underlayer "SUL" 205, interlayer 206, non-granular bottom magnetic layer 500, coupled continuous top magnetic layer 410 and the carbon hard mask 420. Nano-imprint lithography for example is used to create the patterned resist template 430. The template pattern transfer process 432 may include $O_2$ plasma or reverse tone process to transfer the pattern from the patterned resist template 430 into the carbon hard mask 420 of one embodiment.

FIG. 5D shows for illustrative purposes only an example of a continuation of a non-granular single layer trench pattern transfer process of one embodiment. Shown in FIG. 5D is a structure that includes the glass substrate 204, soft underlayer "SUL" 205, interlayer 206, non-granular bottom magnetic layer 500 and coupled continuous top magnetic layer 410. The ion beam etch 440 is used to remove the continuous layer in trenches not covered by the patterned carbon hard mask 445 of one embodiment.

FIG. 5E shows for illustrative purposes only an example of a non-granular magnetic properties alteration of one embodiment. The glass substrate 204, soft underlayer "SUL" 205, interlayer 206 and non-granular bottom magnetic layer 500 are portions of a stack structure shown in FIG. 5E. A process that includes for example $O_2$ plasma 450 is used to remove the etched patterned carbon hard mask 444 leaving the patterned continuous magnetic layer 448. The $O_2$ plasma 450 is one example of the chemical reaction 270 of FIG. 2C used to strip residual carbon hard mask 420 of FIG. 4D and reduce the magnetic moment in the remaining non-granular bottom magnetic layer 500 in the trenches of one embodiment.

Figure 5F:
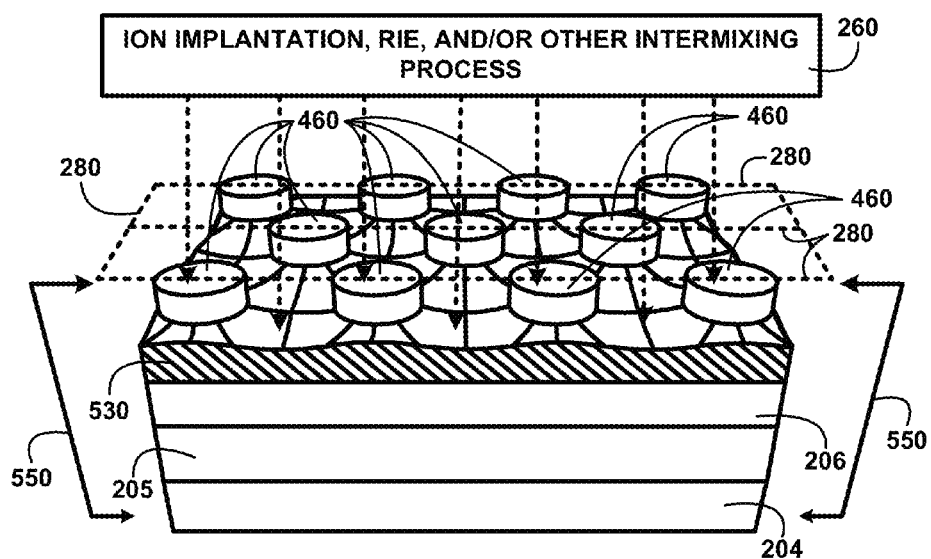
FIG. 5F shows for illustrative purposes only an example of a non-granular magnetic feature of one embodiment.

Non-Granular Magnetic Features:

FIG. 5F shows for illustrative purposes only an example of a non-granular magnetic features of one embodiment. Included in the stack structure showing in FIG. 5F are the glass substrate 204, soft underlayer "SUL" 205 and interlayer 206. The ion implantation, RIE, and/or other intermixing processes 268 are used to make remanent magnetization changes in the non-granular bottom magnetic layer. The non-granular bottom magnetic layer magnetic properties altered in the trenches 530 creates a magnetic separation of the dual-layer recording layer in the features of one embodiment.

The planarized continuous magnetic layer features 460 using the planarization process 280 are a portion of the control of the single layer trench 284 of FIG. 2D. A cross sectional view created using a non-granular bottom magnetic layer section plane 550 of the patterned magnetic features is described in FIG. 5G of one embodiment.

Figure 5G:
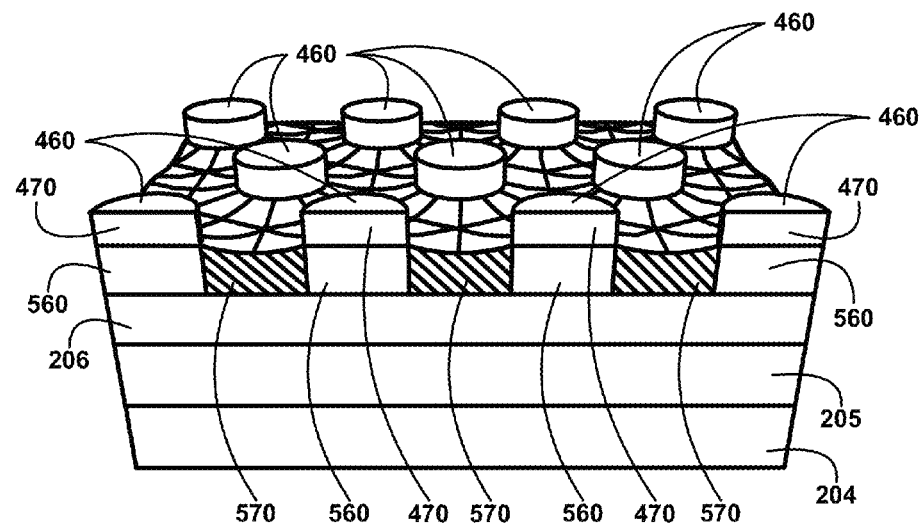
FIG. 5G shows for illustrative purposes only an example of a non-granular magnetic feature cross section of one embodiment.

Non-Granular Single Layer Trench:

FIG. 5G shows for illustrative purposes only an example of a non-granular magnetic features cross section of one embodiment. FIG. 5G shows a cross section view of a stack structure that includes the glass substrate 204, soft underlayer "SUL" 205, interlayer 206, non-granular bottom magnetic layer 500 of FIG. 5A and planarized continuous magnetic layer features 460. The feature sections of magnetic properties not altered show in a non-granular bottom magnetic layer cross section 560.

The continuous top magnetic layer feature cross section 470 combined with the non-granular bottom magnetic layer cross section 560 illustrate the non-granular dual-layer recording feature. The single layer trench 284 of FIG. 2D is showing above the top surface of the non-granular bottom magnetic layer magnetic properties altered in the trenches 530 of FIG. 5F to the top surface of the planarized continuous magnetic layer features 460. The bottom magnetic layer 203 of FIG. 2A remaining in the trench is shown with the remanent magnetization changes created by non-granular layer reduced magnetic moment 570 of one embodiment.

Figure 5H:
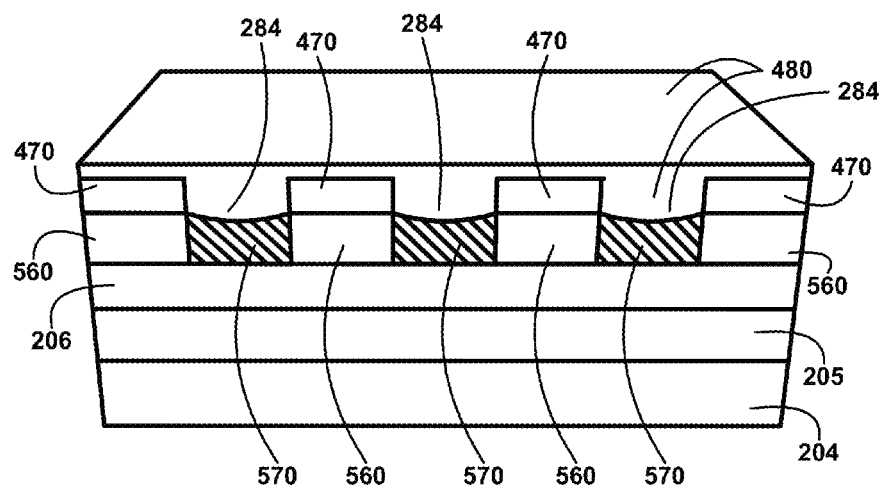
FIG. 5H shows for illustrative purposes only an example of a stack non-granular dual-layer recording layer of one embodiment.

Non-Granular Dual-Layer Magnetic Feature:

FIG. 5H shows for illustrative purposes only an example of a stack non-granular dual-layer recording layer of one embodiment. FIG. 5H shows a completed stack structure including the glass substrate 204, soft underlayer "SUL" 205, interlayer 206, non-granular bottom magnetic layer cross section 560, continuous top magnetic layer feature cross section 470 and COO layer 480. The COO layer 480 is created using a carbon over coat (COO) deposition. The COO deposition back fills the trenches, covers the planarized continuous magnetic layer features 460 of FIG. 4F and create a smooth surface of one embodiment.

The single layer trench 284 to the non-granular bottom magnetic layer 500 of FIG. 5A remaining in the trenches is unaffected by the COO backfilling. The combined view of the continuous top magnetic layer feature cross section 470 and the non-granular bottom magnetic layer cross section 560 shows a high density stack dual-layer recording layer non-granular dual-layer magnetic feature 590 of one embodiment. The height differential between the top surfaces of the non-granular layer reduced magnetic moment 570 and the top surface of the planarized continuous magnetic layer features 460 of FIG. 4F shows the single layer trench 284. The exchange-coupling of the non-granular dual-layer magnetic feature 590 and the single layer trench 284 produced using the dual-layer magnetic recording structure achieves high recording qualities in the fabrication of high areal density magnetic recording stacks including bit-patterned media of one embodiment.

Molecular Magnetic Properties Susceptible to Alteration:

Materials are made up of molecules that are made up of atoms. All atoms have electrons that are in motion. All the electrons do produce a magnetic field as they spin and orbit the nucleus of the atom. The direction of spin and orbit of the electron determines the direction of the magnetic field. The strength of the magnetic field is called the magnetic moment. When two electrons are paired they spin and orbit in opposite directions. Since the magnetic fields produced by the motion of the electrons are in opposite directions, they add up to zero. The overall magnetic field strength of atoms with all paired electrons is zero and the net magnetic moment of the atom is zero. In general, materials that have all paired electrons in the atoms have no net magnetic moment.

Materials that have one or more unpaired electrons are at least slightly magnetic. The greater the number of unpaired electrons in the atoms of a molecule of a material the greater the strength of the net magnetic moment becomes. Reducing or eliminating the number of unpaired electrons in the molecules of a material diminishes or zero-outs the net magnetic moment. Altering the number of unpaired electrons in the molecules of a material may be achieved using a chemical process.

Figure 6A:
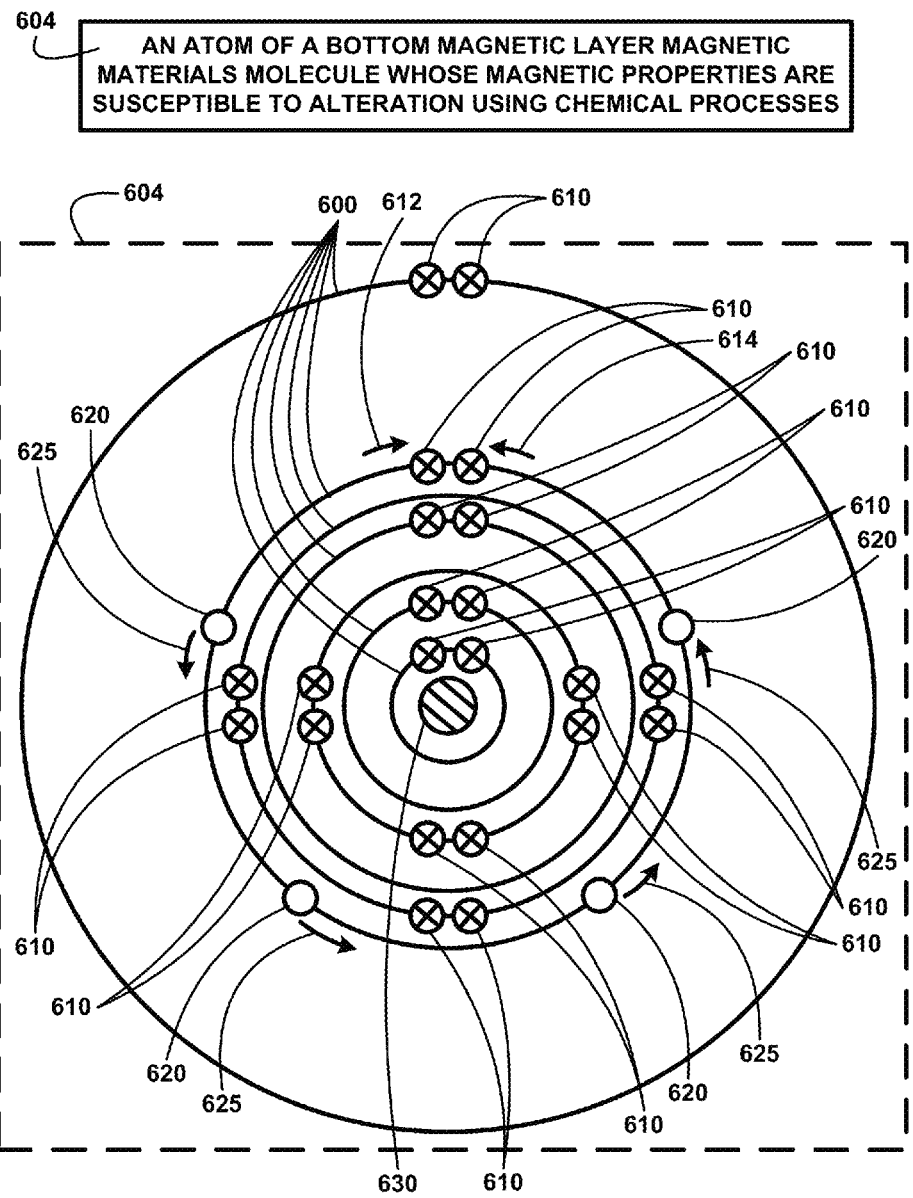
FIG. 6A shows for illustrative purposes only an example of a magnetic molecular whose magnetic properties are susceptible to alteration using chemical processes of one embodiment.

FIG. 6A shows for illustrative purposes only an example of an atom of a magnetic materials molecule whose magnetic properties are susceptible to alteration using chemical processes of one embodiment. FIG. 6A shows an atom of a bottom magnetic layer magnetic materials molecule whose magnetic properties are susceptible to alteration using chemical processes 604. The atom includes a nucleus 630 around which are located multiple electron orbits 600. Orbiting the nucleus 630 are both paired electrons 610 and multiple cases of an unpaired electron 620. The paired electrons 610 have a net magnetic moment of zero. The direction of spin and orbit of the first paired electron 612 is opposite the direction of spin and orbit of the second paired electron 614. The spin and orbit of each unpaired electron 620 is in the same unpaired electron direction 625. The multiple cases of an unpaired electron 620 produce a strong magnetic moment. The resulting magnetic properties of the bottom magnetic layer magnetic materials show a strong magnetic field and a strong net magnetic moment.

Figure 6B:
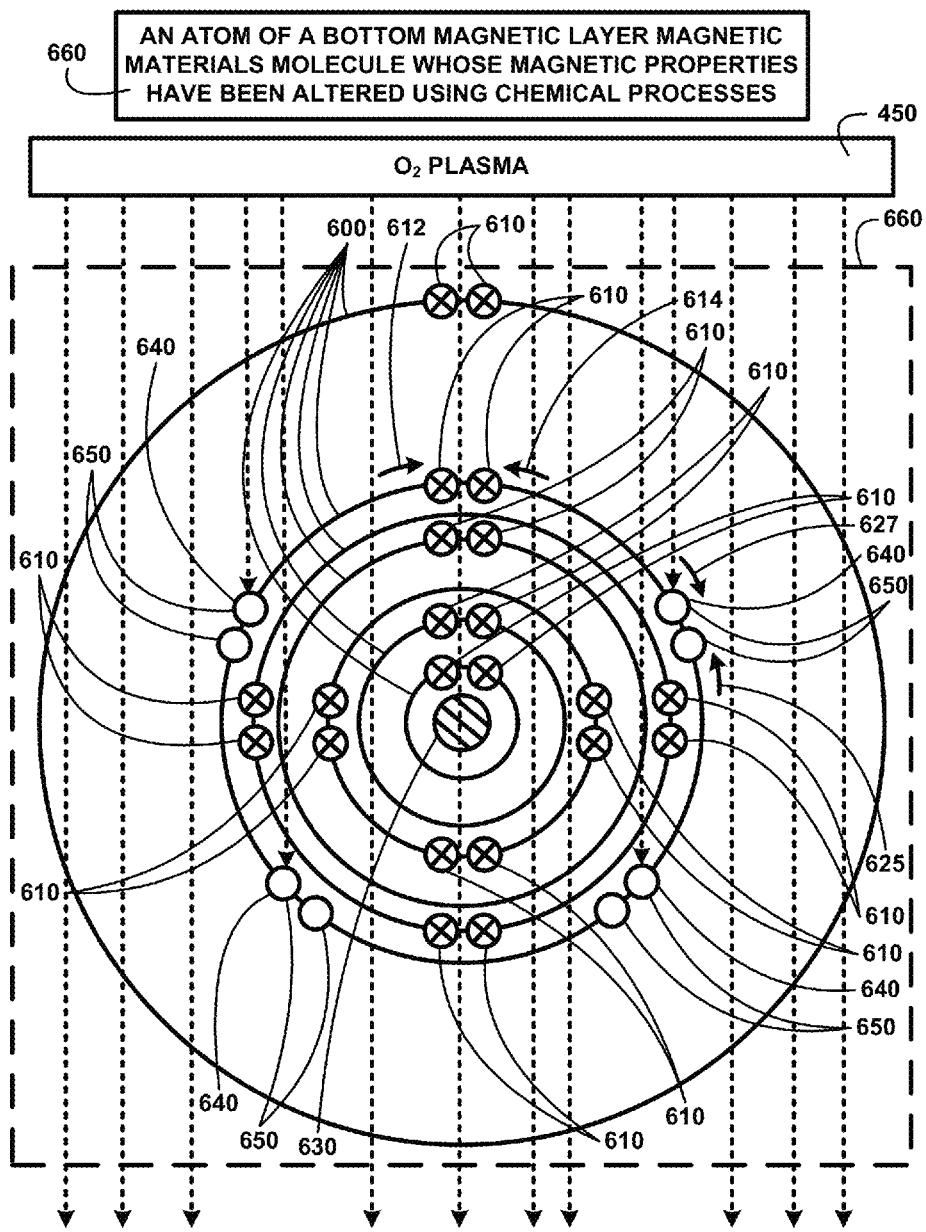
FIG. 6B shows for illustrative purposes only an example of a magnetic molecular whose magnetic properties have been altered using a chemical processes of one embodiment.

Molecular Magnetic Properties Altered Using a Chemical Process:

FIG. 6B shows for illustrative purposes only an example of a magnetic molecule whose magnetic properties have been altered using a chemical processes of one embodiment. FIG. 6B shows an atom of a bottom magnetic layer magnetic materials molecule whose magnetic properties have been altered using chemical processes 660. Orbiting the nucleus 630 are the paired electrons 610. The spin and orbit of the first paired electron direction 612 is opposite the spin and orbit of the second paired electron direction 614.

The multiple cases of an unpaired electron 620 of FIG. 6A producing the strong magnetic moment have been altered using a chemical process including $O_2$ plasma 450. The $O_2$ plasma 450 caused oxidation to take place on atoms of the molecules of the bottom magnetic layer magnetic materials. The oxidizing chemical process 640 has added an electron that paired up with each unpaired electron 620 of FIG. 6A creating oxidation altered paired electrons 650.

The oxidation altered paired electrons 650 spin and orbit the nucleus 630 in opposite directions of the electron orbits 600. The original unpaired electron 620 of FIG. 6A is the first electron of the oxidation altered paired electrons 650 and is maintaining the spin and orbit in the same unpaired electron direction 625. The added oxidization electron is the second electron of the oxidation altered paired electrons 650 and is spinning and orbiting of the nucleus 630 in an oxidization electron direction 627. The oxidization electron direction 627 is opposite the unpaired electron direction 625.

The spinning and orbiting of the nucleus 630 in opposite directions by the oxidation altered paired electrons 650 causes the overall magnetic field strength to be zero and the magnetic moment of the atom to be zero. The atom after alteration using the oxidizing chemical process 640 has a net magnetic moment of zero. The chemical process alteration of the magnetic properties of the exposed bottom magnetic layer magnetic materials has been used to reduce the net magnetic moment. The reduction of the net magnetic moment of the exposed bottom magnetic layer magnetic materials is used to create a magnetic separation 385 of the patterned recording layer features.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. A dual-layer magnetic recording structure, comprising:
a top magnetic layer having a bit patterned area,
wherein the bit patterned area comprises physically separated islands of magnetic material; and
a bottom magnetic layer comprising
a first region of magnetic grains with a first height and a first magnetic moment and
a second region of magnetic grains with a second height and a second magnetic moment,
wherein the first height is greater than the second height,
wherein the second magnetic moment is less than the first magnetic moment,
wherein adjacent magnetic grains in the first region are exchange-coupled through the top magnetic layer, and
wherein the adjacent magnetic grains and the top magnetic layer are configured to switch together in the dual-layer magnetic recording structure.

2. The dual-layer magnetic recording structure of claim 1, wherein the first region of the bottom magnetic layer includes magnetic materials, and
wherein the second region of the bottom magnetic layer includes the magnetic materials modified by oxidation.

3. The dual-layer magnetic recording structure of claim 1, wherein the top magnetic layer includes continuous magnetic materials, and
wherein the bottom magnetic layer includes granular magnetic materials.

4. The dual-layer magnetic recording structure of claim 1, wherein the first region of the bottom magnetic layer includes magnetic materials, and
wherein the second region of the bottom layer includes the magnetic materials modified by a chemical process selected from a reactive ion etch (RIE) with oxygen gas ($O_2$), tetrafluoromethane ($CF_4$), trifluoromethane ($CHF_3$), chlorine gas ($Cl_2$), and/or other gases; ion implantation; oxidizing the metal particles; oxidative decomposition; and other intermixing processes.

5. The dual-layer magnetic recording structure of claim 1, wherein the islands and the first region of the bottom magnetic layer are exchange-coupled for dual-layer recording bit patterned media.

6. A recording structure, comprising:
a top magnetic layer comprising physically separated islands of magnetic material corresponding to magnetic recording bits; and
a bottom magnetic layer comprising
a first region of magnetic grains with a first height and a first magnetic moment and
a second region of magnetic grains with a second height and a second magnetic moment,
wherein the first height is greater than the second height, wherein the second region is altered by implanted ions making the second magnetic moment less than the first magnetic moment, and wherein the top magnetic layer and adjacent magnetic grains in the first region switch together through exchange-coupling between the layers.

7. The recording structure of claim 6, wherein the top magnetic layer includes a coupled continuous magnetic layer.

8. The recording structure of claim 7, wherein the bottom magnetic layer includes a decoupled granular magnetic layer including columnar magnetic grains decoupled by grain boundaries selected from silicon dioxide ($SiO_2$), titanium dioxide ($TiO_2$), and carbon (C).

9. The recording structure of claim 8, wherein the islands of the top magnetic layer and underlying portions of the bottom magnetic layer are configured to switch together as single grains.

10. The recording structure of claim 6, wherein the bottom magnetic layer includes a non-granular magnetic layer.

11. The recording structure of claim 6, wherein magnetic properties in at least another portion of the bottom magnetic layer are unaltered through an absence of implanted ions in the another portion of the bottom magnetic layer, and wherein the another portion of the bottom magnetic layer is exchange-coupled through the top magnetic layer for creating an exchange-coupled, dual-layer magnetic recording structure.

12. An apparatus, comprising:

a substrate;

a soft underlayer over the substrate;

an interlayer over the soft underlayer;

a first recording layer of a dual-layered recording layer over the interlayer, wherein the first recording layer comprises a first region of magnetic grains having less height and a reduced magnetic moment compared to a second region of magnetic grains; and a second recording layer of the dual-layered recording layer, wherein the second recording layer comprises physically separated islands of magnetic material corresponding to magnetic recording bits, and wherein the islands cover and are exchange-coupled with the second region of the first recording layer to switch adjacent magnetic grains of the second region.

13. The apparatus of claim 12, wherein the second region of the first recording layer comprises a granular magnetic material comprising magnetic grains and grain boundaries selected from $SiO_2$, $TiO_2$, and C, and wherein the first region of the first recording layer comprises the granular magnetic material modified by oxidation or ion implantation.

14. The apparatus of claim 13, wherein the first region of the first recording layer comprises the granular magnetic material modified by oxidation.

15. The apparatus of claim 13, wherein the first region of the first recording layer comprises the granular magnetic material modified by ion implantation.

16. The apparatus of claim 13, wherein the islands of the second recording layer comprise a continuous magnetic material.

17. The apparatus of claim 16, wherein the islands of the second recording layer and underlying magnetic grains of the first recording layer are exchange coupled and switch together as single grains.

18. The apparatus of claim 17, wherein the second recording layer has a thickness of about 8 nm or less.

19. The apparatus of claim 17, further comprising a carbon overcoat over the dual-layered recording layer.

20. The apparatus of claim 19, wherein the islands of the second recording layer are physically separated by the carbon overcoat.

21. The apparatus of claim 20, wherein the apparatus is configured with an areal recording density of about 1 $Tb/in^2$ or more.

* * * * *